United States Patent
Barone

(10) Patent No.: US 8,726,930 B2
(45) Date of Patent: May 20, 2014

(54) DUAL DISK CHECK VALVE WITH SLOTTED STOP BAR

(75) Inventor: Michael Barone, Amston, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/570,926

(22) Filed: Aug. 9, 2012

(65) Prior Publication Data
US 2014/0041739 A1    Feb. 13, 2014

(51) Int. Cl.
*F16K 15/03*    (2006.01)

(52) U.S. Cl.
USPC ........................................ 137/512.1; 137/527

(58) Field of Classification Search
USPC ............... 137/512.1, 904, 527, 512.5, 527.6; 251/64
See application file for complete search history.

(56) References Cited

U.S. PATENT DOCUMENTS

| 2,358,101 | A | * | 9/1944 | Randall ............................ 137/70 |
| 4,373,544 | A | | 2/1983 | Goodman et al. |
| 5,784,894 | A | | 7/1998 | Army, Jr. et al. |
| 5,836,349 | A | | 11/1998 | Kimberly et al. |
| 5,924,445 | A | | 7/1999 | Ambrose et al. |
| 6,851,255 | B2 | | 2/2005 | Aitchison et al. |
| 7,114,519 | B2 | | 10/2006 | Aitchison et al. |
| 7,422,029 | B2 | | 9/2008 | Denike et al. |
| 7,493,770 | B2 | | 2/2009 | Christianson et al. |
| 7,568,498 | B2 | | 8/2009 | Denike et al. |
| 7,779,859 | B2 | | 8/2010 | Denike et al. |
| 8,181,669 | B2 | | 5/2012 | Dehais et al. |
| 8,201,576 | B2 | | 6/2012 | Klein |
| 2008/0053536 | A1 | | 3/2008 | Denike et al. |
| 2008/0072973 | A1 | | 3/2008 | McGonigle et al. |
| 2008/0078458 | A1 | | 4/2008 | Denike et al. |
| 2008/0078459 | A1 | | 4/2008 | Warriner et al. |
| 2009/0071549 | A1 | | 3/2009 | Denike et al. |
| 2010/0282340 | A1 | | 11/2010 | Dehais et al. |

FOREIGN PATENT DOCUMENTS

EP    2249068 A2    11/2010

* cited by examiner

*Primary Examiner* — Kevin Lee
*Assistant Examiner* — Macade Brown
(74) *Attorney, Agent, or Firm* — Cantor Colburn LLP

(57) ABSTRACT

A dual disk check valve is provided and includes a mechanical stop. The mechanical stop has a central portion and includes bars disposed in the central portion. The bars have substantially rectangular cross-sectional shapes and are disposed substantially in parallel with one another to define a slot in the central portion.

20 Claims, 6 Drawing Sheets

DUAL DISK CHECK VALVE WITH SLOTTED STOP BAR

BACKGROUND OF THE INVENTION

The subject matter disclosed herein relates to a dual disk check valve and, more particularly, to a dual disk check valve with a slotted stop bar.

Dual disk check valves are employed in various types of ductwork and piping and utilize pivoting disks that are commonly referred to as flappers. The flappers swing open and close depending on the corresponding direction of fluid flow through the ductwork. When the valve opens during normal conditions, it is imperative that the disks do not swing near or over the center position due to the typical configuration of dual disk check valves. If such a condition occurs, net forces on the upstream side of the disks could hold the check valve open during reverse flow conditions. This would prevent the check valve from performing its primary function of preventing reverse flows by closing.

In a common method of preventing the disks from opening too much, a "stop pin" is employed. The disks hit the pin at a predetermined angle, which is usually no more than 80 degrees, and stop swinging open. However, because the disks are typically swinging open at maximum velocity when they hit the pin, the pin needs to be relatively stiff. Thus, an impact load occurs when the disk(s) hits the pin. Over many cycles, these high loads can fatigue the disks or the pin and cause either to fracture. Fracture would be considered a catastrophic failure since loose metal parts could be released into a fluid stream.

BRIEF DESCRIPTION OF THE INVENTION

According to one aspect of the invention, a dual disk check valve is provided and includes a mechanical stop. The mechanical stop has a central portion and includes bars disposed in the central portion. The bars have substantially rectangular cross-sectional shapes and are disposed substantially in parallel with one another to define a slot in the central portion.

According to another aspect of the invention, a mechanical stop of a dual disk check valve is provided and includes an elongate member having distal sections at opposite ends thereof, intermediate sections coupled to the distal sections and a central portion between the intermediate sections. The mechanical stop further includes bars respectively coupled to the intermediate sections. The bars have substantially rectangular cross-sectional shapes and are disposed substantially in parallel with one another to define a slot in the central portion.

According to yet another aspect of the invention, a mechanical stop of a dual disk check valve is provided and includes an elongate member having distal sections formed as anti-rotation features at opposite ends thereof, substantially rectangular intermediate sections coupled to the distal sections and a central portion between the intermediate sections, and bars respectively coupled to respective interior portions of the intermediate sections for disposition thereof in the central portion. The bars have substantially rectangular cross-sectional shapes and are disposed substantially in parallel with one another to define a slot in the central portion.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

A dual disk check valve typically includes a check valve body and disks. The check valve body includes a seat, a hinge and a housing. The seat may be annularly shaped and formed to define an aperture. The hinge may be provided as a pin-hinge with a central pivot axis defined along a pin and is disposed to bifurcate the aperture defined by the seat to thereby further define an opening on one side of the hinge and another opening on the other side of the hinge. The housing is coupled to opposite ends of the hinge and normally includes a mechanical stop, such as a stop pin.

The disks are pivotably coupled to the hinge to pivot or swing about the central pivot axis in response to a fluid pressure differential between fluid disposed upstream and fluid disposed downstream from the dual disk check valve. In particular, the disks are configured to pivot from respective closed positions at which the disks prevent fluid flow through the openings to respective open positions at which fluid flow through the openings is permitted. When the disks swing toward the respective open positions, they independently impact the mechanical stop and are prevented from swinging beyond a given opening angle.

In accordance with aspects of the invention, problems associated with the use of stop pins in dual disk check valves are addressed. These problems include the need for the stop pins to be relatively rigid as required to meet internal stresses caused during impacts. This in turn increases impact loading imparted by the disks and limits an effective gain of increasing a size of the stop pins. Also, the round cross-section of a stop pin inherently makes the stop pin a relatively poor geometric candidate from strength to weight standpoint. Since check valve pins are usually formed of solid stainless steel or similar metals, this problem leads to a substantial increase in the weight of the check valve as a whole. Moreover, increasing the diameter of the stop pin to handle increased impact loading will decrease the possible open angle of the disks and increase a pressure drop across the check valve. This increased pressure drop can lead to a need for increasing a size of the check valve, which will compound the effects of increased weight, size and cost. Finally, the roundness of a stop pin means that there is essentially line contact between disks and the stop pin when contact is made. This creates high bearing stresses that are superimposed with the bending stresses.

Figure 1:
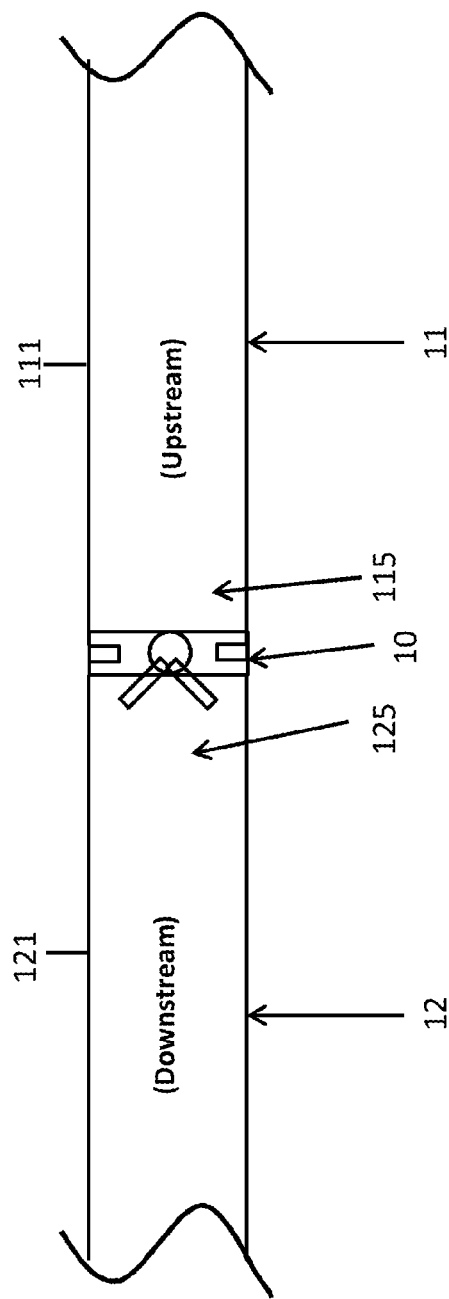
FIG. 1 is a schematic view of a check valve in accordance with embodiments.

With reference to FIG. 1, a dual disk check valve ("check valve") 10 is provided. The check valve 10 is interposed between upstream ductwork 11 and downstream ductwork 12. As shown in FIG. 1, the upstream ductwork 11 is formed of a single duct 111 and the downstream ductwork 12 is similarly formed of a single duct 121. This configuration is, of course, exemplary, and it is to be understood that alternate configurations are possible.

Figure 2:
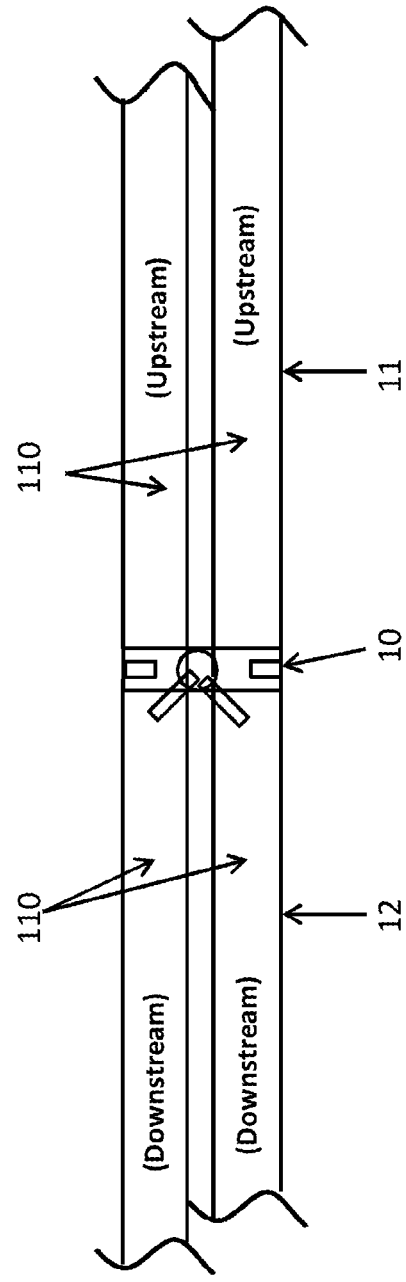
FIG. 2 is a schematic view of a check valve in accordance with further embodiments.

One such alternate configuration is illustrated with reference to FIG. 2 in which at least one of the upstream ductwork 11 and the downstream ductwork 12 is illustrated as possibly including multiple ducts 110. For example, as shown in FIG. 2, both the upstream and the downstream ductwork 11 and 12 may include two ducts 110 each whereby corresponding ducts 110 in the upstream and downstream ductwork 11 and 12 communicate with one another by way of the check valve 10. In such cases, the disks may open and close independently. Although illustrated as having a 1:1 ratio, it is to be understood that the upstream ductwork 11 and the downstream ductwork 12 need not have the same number of multiple ducts 110. That is, the two ducts 110 of the upstream ductwork 11 could lead to a single duct 110 in the downstream ductwork 12, for example.

Figure 3:
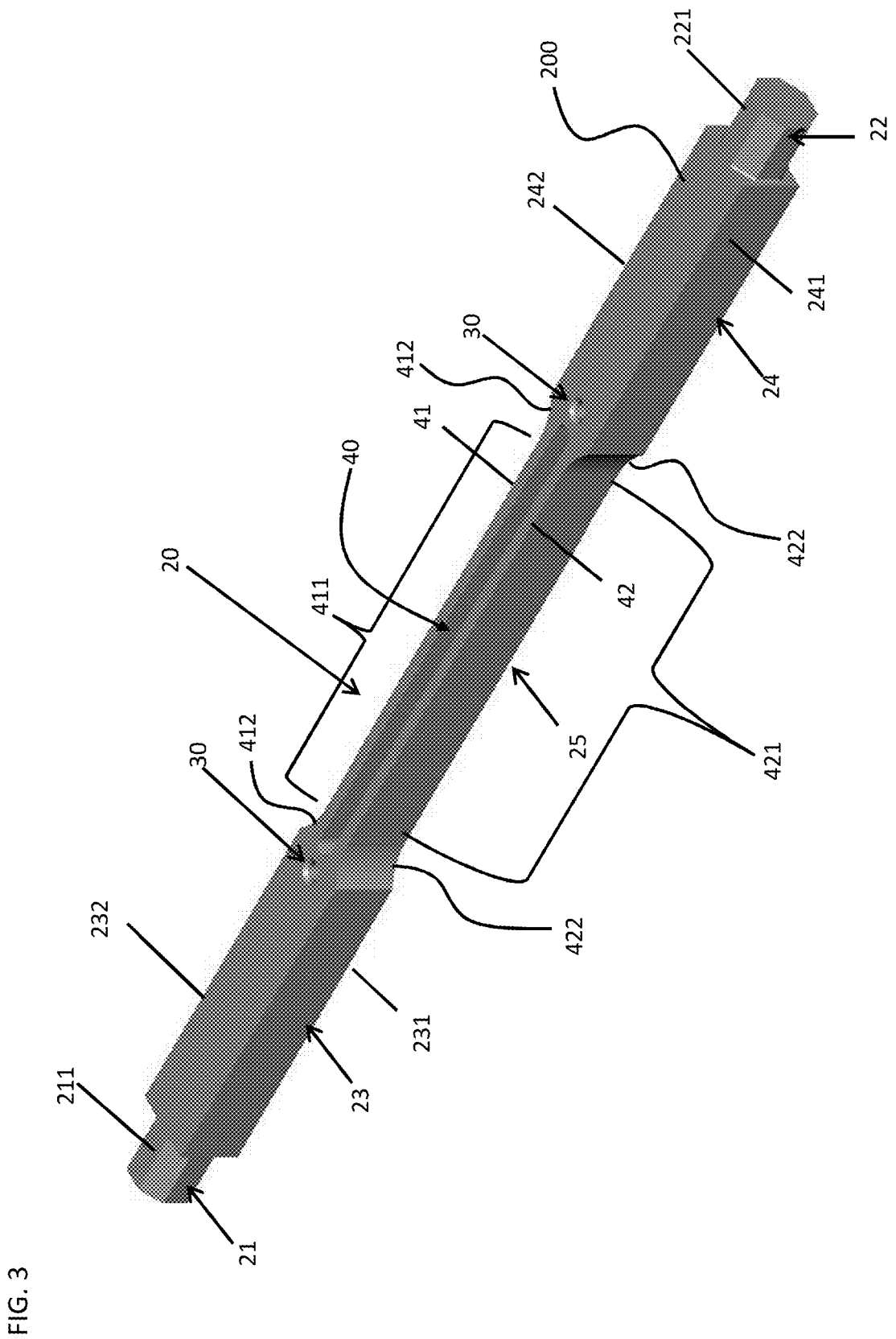
FIG. 3 is a perspective view of a dual disk check valve with a slotted stop bar.

With reference to FIG. 3, a mechanical stop 20 is provided for use with a valve, such as the check valve 10 described above, to prevent the disks of the check valve from swinging open beyond a given angle. The mechanical stop 20 would normally be supported by the check valve 10 housing in a location defined along the opening tracks of each of the disks. As shown in FIG. 3, the mechanical stop 20 is an elongate member 200 and includes first and second distal sections 21, 22 at opposite ends thereof. Proceeding inwardly from the first and second distal sections 21, 22 the mechanical stop 20 further includes intermediate sections 23, 24 coupled to respective interior portions of the distal sections 21, 22. A central section 25 is defined between the intermediate sections 23, 24.

The first and second distal sections 21, 22 are anti-rotation features and may be formed as polygonal (i.e., six-sided) volumetric bodies 211, 221 that may be slightly elongated in a dimension that is defined transversely with respect to an elongation dimension of the mechanical stop 20 as a whole. The first and second distal sections 21, 22 are configured to be inserted into through-holes defined through posts disposed on the check valve 10 housing. The six-sided shaped of the first and second distal sections 21, 22 insures that an angular orientation of the mechanical stop 20 is correct and prevents rotation of the mechanical stop 20 in use. In accordance with embodiments, the first and second distal sections 21, 22 may be formed from rectangular bodies with chamfered or, in some cases, rounded edges.

The intermediate sections 23, 24 are generally rectangular in shape. Thus, each of the intermediate sections 23, 24 includes opposing faces 231, 232 and 241, 242 that face in opposite directions. When the disks of the check valve 10 respectively impact the mechanical stop 20, the interior surface of one of the disks contacts the corresponding faces 231, 241 and the interior surface of the other disk contacts the corresponding faces 232, 242. This contact is spread over the surface area of the faces 231, 232 and 241, 242 and is therefore non-linear with bearing areas that are orders of magnitude larger than those of corresponding stop-pin designs. Thus, bearing stresses on the disks and the mechanical stop 20 are substantially lower than those generated with a typical stop pin.

The intermediate sections 23, 24 are further formed to define grounding holes 30 proximate to the central section 25. The grounding holes 30 extend through the intermediate sections 23, 24 and serve to support tension springs that may be installed in the check valve 10 to bias the disks toward the respective closed positions.

The central section 25 is defined between the intermediate sections 23, 24 and is formed to define a thin slot 40 that extends along the elongate dimension of the mechanical stop 20. This slot 40 is formed between two separate thin bars 41, 42 that are coupled to respective interior portions of the intermediate sections 23, 24 and are disposed substantially in parallel with one another. The thin bar 41 has a main portion 411 with a substantially rectangular cross-sectional shape and flared ends 412 that are coupled to the respective interior portions of the intermediate sections 23, 24. The thin bar 42 is similarly constructed and has a main portion 421 with a substantially rectangular cross-sectional shape and flared ends 422 that are coupled to the respective interior portions of the intermediate sections 23, 24. A shortest dimension of the thin bar 41 and the thin bar 42 is oriented transversely with respect to the elongation dimension of the elongate member 200.

Relative sizes and shapes of each of the thin bars 41 and 42 may be independently tunable for various applications of the check valve 10. That is, the thin bar 41 may be configured substantially similarly to thin bar 42 in some embodiments and substantially dissimilarly in other embodiments. The latter case may be particularly suitable where the check valve 10 is disposed in ductwork with multiple independent ducts upstream and downstream from the check valve 10.

Due to the thin bars 41 and 42 having the main portions 411 and 421 with substantially rectangular cross-sectional shapes, the thin bars 41 and 42 effectively transform the single mechanical stop 20 into two separately acting mechanical stops for each of the disks of the check valve 10. This accomplishes several benefits. First, the two thin bars 41, 42 create a lower spring constant stop thereby enabling larger deflections with lower stresses. Second, the mechanical stop 20 is made into effective mechanical stops for each disk that are independent of one another. Thus, when both disks hit the mechanical stop 20 at virtually the same time, relatively large impacts are avoided due to deflection of the mechanical stop 20. That is, the slot 40 permits a bending of the mechanical stop 20 that would not be otherwise possible.

The rectangular cross-sectional shapes of the thin bars 41, 42 have advantages over round cross-sectional shapes especially as utilized in check valves. Rectangular cross-sectional shaped sections are relatively efficient for carrying bending loads with respect to their size. So, for any given diameter stop pin, the strength of the equivalent rectangular section is about 1.7 times greater. In addition, a rectangular cross-sectional shaped section can be employed without decreasing the opening angle of the disks by lengthening only one leg of the rectangle. So, a rectangular section with a 2:1 aspect ratio, for example, would have about 3.4 times the strength of the equivalent pin with a diameter of the shorter side of the rectangle. Rectangular cross-sectional shaped sections are also more efficient for carrying bending loads with respect to weight than stop pins. As the rectangular section gets thinner and wider, it begins to function as mechanical spring, allowing larger deflections upon contact with the corresponding disk. As the deflections get larger, the nature of the loading changes from impact loading to pure dynamic bending loading. A mechanical stop that performs like a spring converts kinetic energy from the disk to potential energy stored in the spring as well as some energy that is dissipated in the form of heat.

Figure 4:
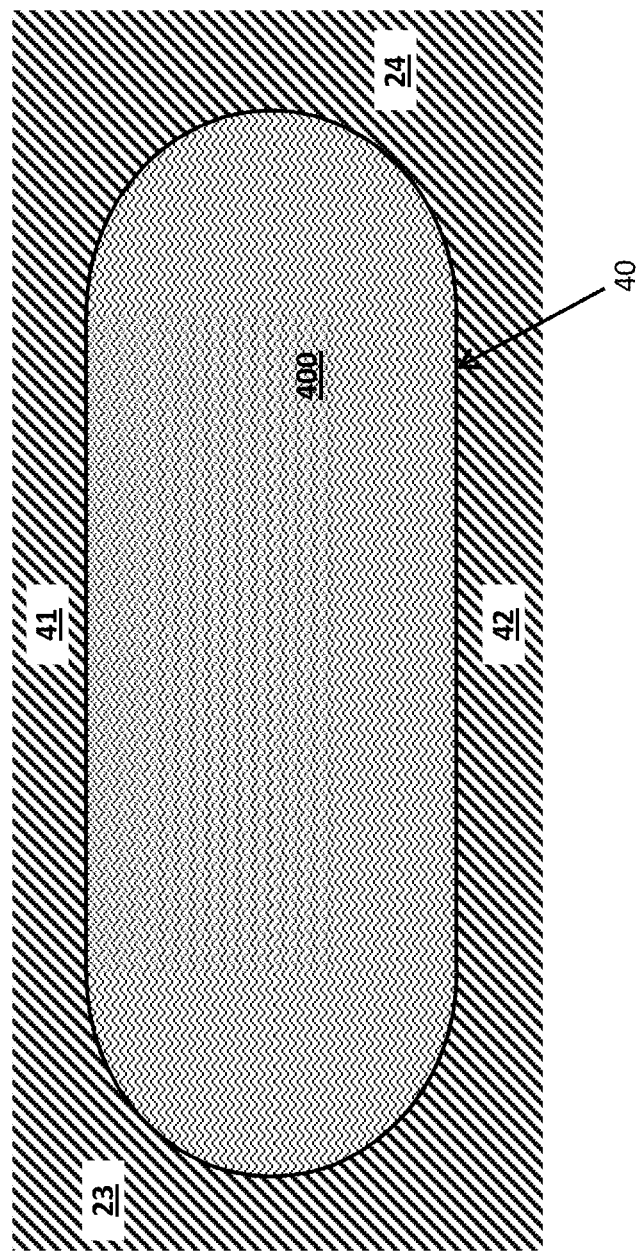
FIG. 4 is a top-down view of a slot of the dual disk check valve of FIG. 3 in accordance with embodiments.

In accordance with embodiments and, with reference to FIG. 4, the slot 40 may be filled a non-elastic energy absorbing material 400. For expected fluid temperatures lower than approximately 500 degrees F., non-metallic materials such as plastics, elastomers or trapped viscous fluids may be considered for the filling. Where appropriate for expected conditions, metallic energy dissipating materials can also be considered for the filing. These may include wire meshes or friction plates.

Figure 5:
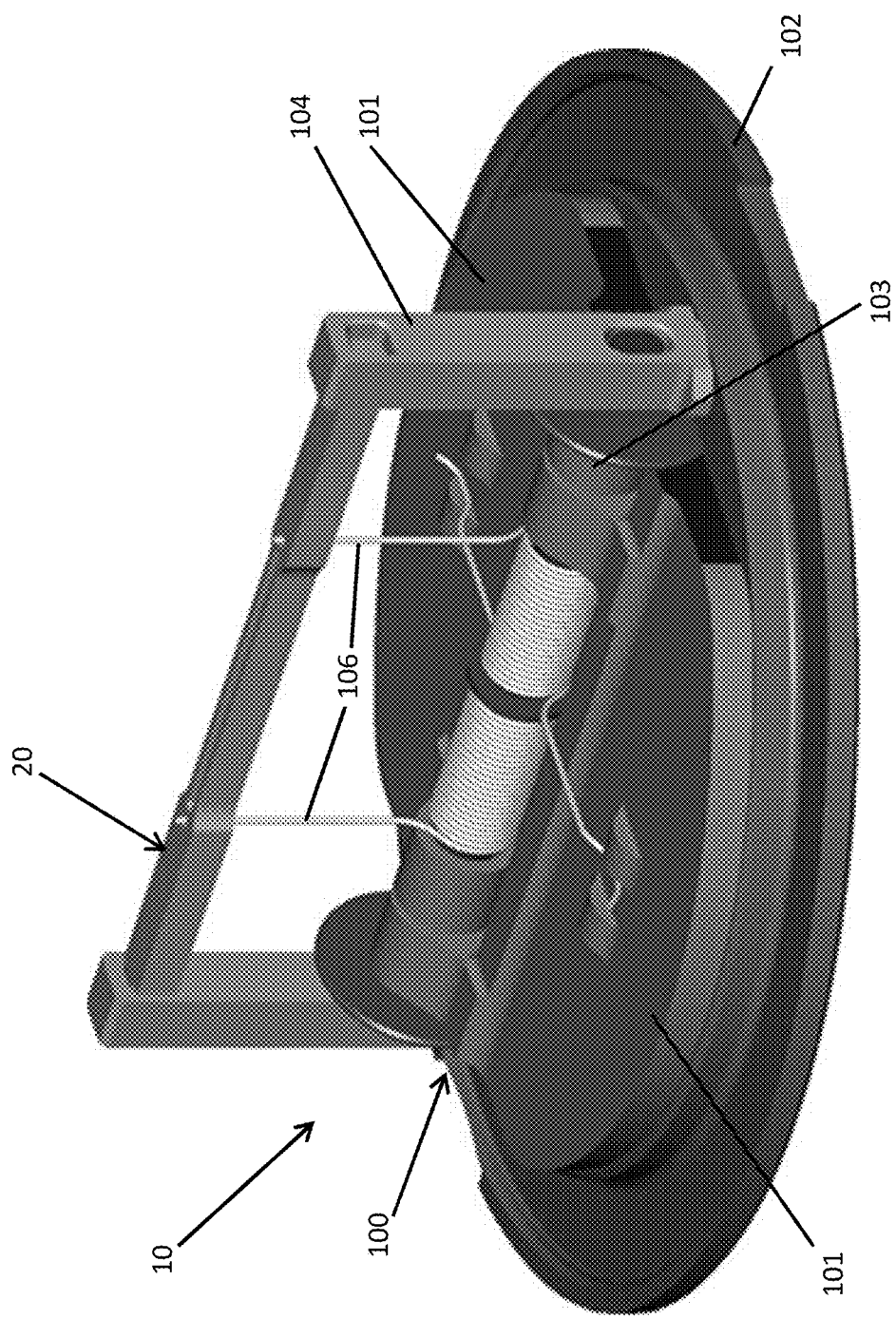
FIG. 5 is a perspective view of a closed dual disk check valve in accordance with embodiments.
Figure 6:
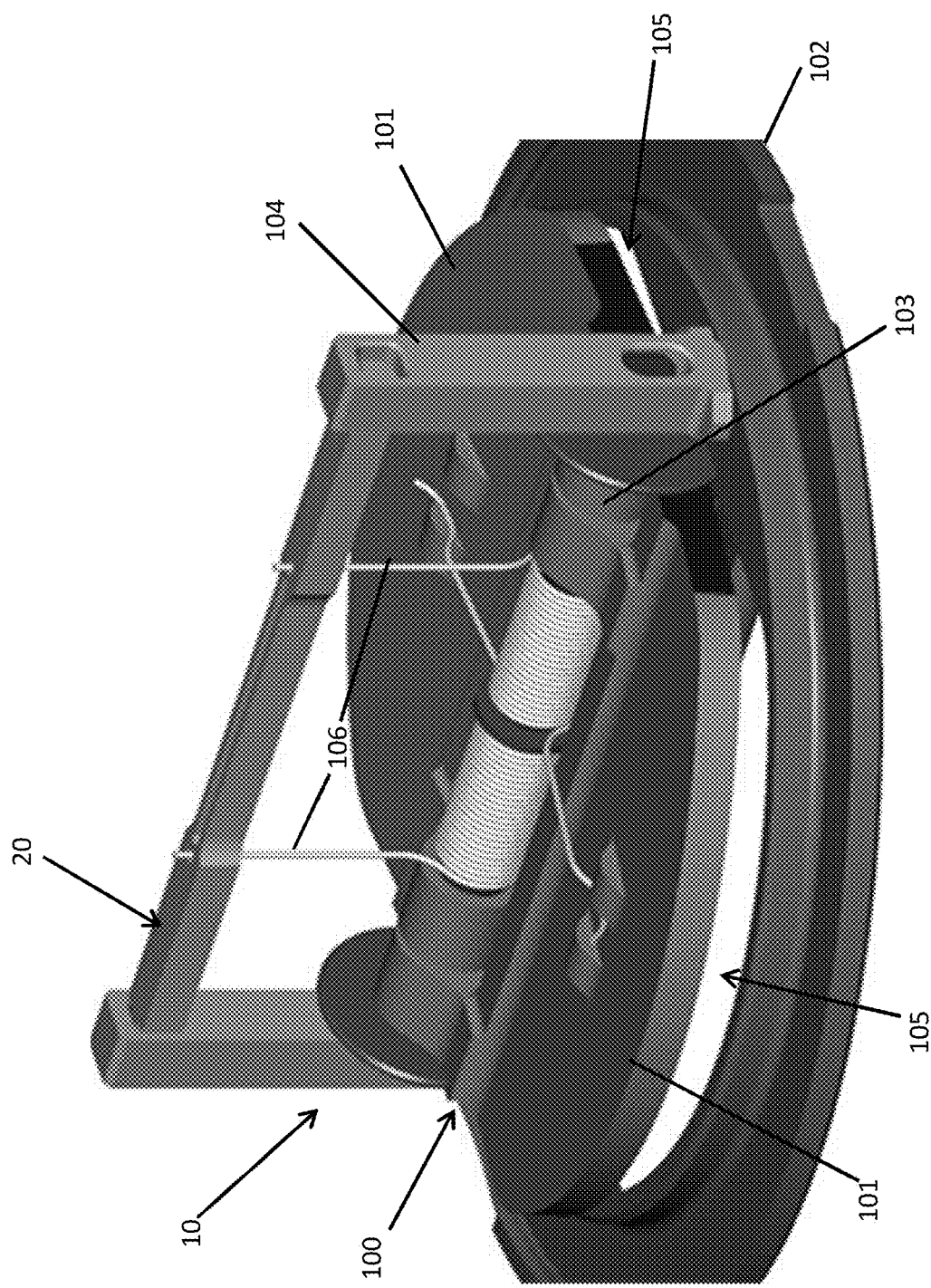
FIG. 6 is a perspective view of the dual disk check valve of FIG. 5 in a partially open condition.
Figure 7:
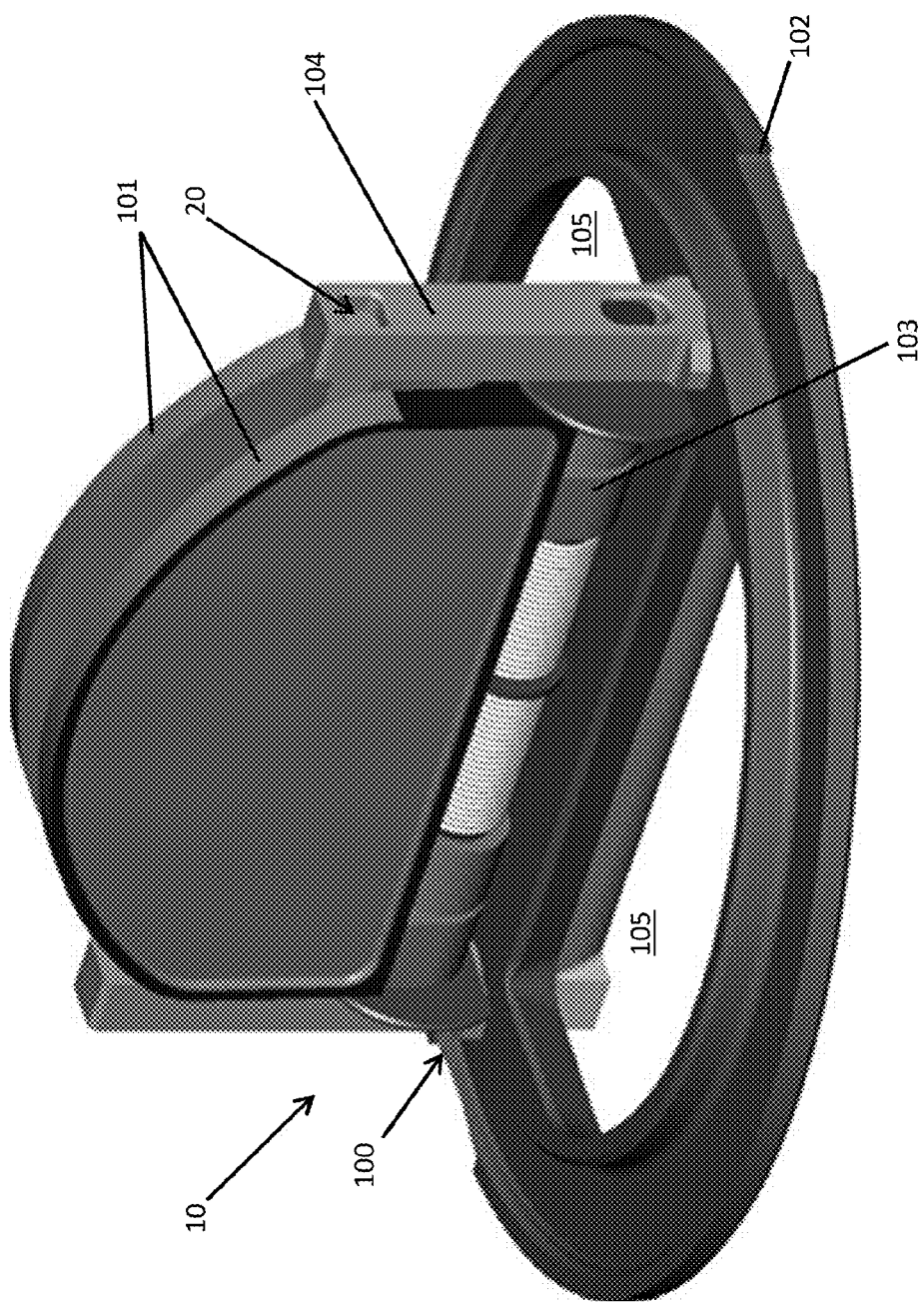
FIG. 7 is a perspective view of the dual disk check valve of FIGS. 5 and 6 in a fully open condition.

With reference to FIGS. 5-7, a check valve 10 is illustrated in closed, partially open and fully open conditions, respectively. As shown, the check valve 10 may include a check valve body 100 and disks 101. The check valve body 100 includes a seat 102, a hinge 103 and a housing 104. The seat 102 may be annularly shaped and formed to define an aperture 105 (see FIG. 7). The hinge 103 may be provided as a pin-hinge with a central pivot axis defined along a pin and may be disposed to bifurcate the aperture 105 defined by the seat 102 to thereby further define openings on either side of the hinge 103. The housing 104 is coupled to opposite ends of the hinge 103 and normally includes the mechanical stop 20 as described above.

The disks 101 are pivotably coupled to the hinge 103 to pivot or swing about the central pivot axis in response to a fluid pressure differential between fluid disposed upstream and fluid disposed downstream from the check valve 10. In particular, the disks 101 are biased by elastic elements 106 to remain in respective closed positions (see FIG. 5) at which the disks 101 prevent fluid flow through the openings. However, when the fluid pressure differential is sufficiently large to overcome the bias applied by the elastic elements 106, the disks 101 begin to open (see FIG. 6) and eventually swing into respective open positions (see FIG. 7) whereby fluid flow through the openings is permitted. When the disks 101 swing toward the respective open positions, they independently impact the mechanical stop 20 and are thereby prevented from swinging beyond a given opening angle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dual disk check valve, comprising:
a mechanical stop, the mechanical stop having a central portion and including:
bars disposed in the central portion, the bars having substantially straight and rectangular cross-sectional shapes along respective entireties of respective lengths of each of the bars and being disposed substantially in parallel with one another to define a slot in the central portion along the respective entireties of the respective lengths of each of the bars.

2. The check valve according to claim 1, further comprising distal sections are configured as anti-rotation features.

3. The check valve according to claim 1, further comprising intermediate sections to which respective opposite ends of the bars are coupled, the intermediate sections having substantially rectangular cross-sectional shapes.

4. The check valve according to claim 3, wherein the intermediate sections are each formed to define grounding holes for tension springs and each have opposite faces that are configured to impact check valve disks swinging open.

5. The check valve according to claim 3, wherein each of the respective opposite ends of the bars comprises flared end.

6. The check valve according to claim 1, wherein a relative shape and size of each of the bars is independently tunable.

7. The check valve according to claim 1, wherein a shortest dimension of each of the bars is transversely oriented with respect to an elongation dimension of the elongate member.

8. A dual disk check valve, comprising:
a mechanical stop, the mechanical stop having a central portion and including:
bars disposed in the central portion, the bars having substantially rectangular cross-sectional shapes and being disposed substantially in parallel with one another to define a slot in the central portion,
wherein the slot is filled with a non-elastic energy absorbing material.

9. A mechanical stop of a dual disk check valve, comprising:
an elongate member having distal sections at opposite ends thereof, intermediate sections coupled to the distal sections and a central portion between the intermediate sections; and
bars respectively including opposite ends, the opposite ends of each of the bars being respectively coupled to the intermediate sections,
the bars having substantially straight and rectangular cross-sectional shapes along respective entireties of respective lengths of each of the bars and being disposed substantially in parallel with one another to define a slot in the central portion along the respective entireties of the respective lengths of each of the bars.

10. The mechanical stop according to claim 9, wherein the distal sections are configured as anti-rotation features.

11. The mechanical stop according to claim 9, wherein the intermediate sections have substantially rectangular cross-sectional shapes.

12. The mechanical stop according to claim 9, wherein the intermediate sections are formed to define grounding holes for tension springs.

13. The mechanical stop according to claim 12, wherein the grounding holes are proximate to the central section.

14. The mechanical stop according to claim 9, wherein the intermediate sections each have opposite faces that are configured to impact check valve disks swinging open.

15. The mechanical stop according to claim 14, wherein a contact area between the opposite faces and the disks is non-linear.

16. The mechanical stop according to claim 9, wherein each of the respective opposite ends of each of the bars comprises flared end.

17. The mechanical stop according to claim 9, wherein a relative shape and size of each of the bars is independently tunable.

18. The mechanical stop according to claim 9, wherein a shortest dimension of each of the bars is transversely oriented with respect to an elongation dimension of the elongate member.

19. A mechanical stop of a dual disk check valve, comprising:
an elongate member having distal sections at opposite ends thereof, intermediate sections coupled to the distal sections and a central portion between the intermediate sections; and bars respectively coupled to the intermediate sections, the bars having substantially rectangular cross-sectional shapes and being disposed substantially in parallel with one another to define a slot in the central portion, wherein the slot is filled with a non-elastic energy absorbing material.

20. A mechanical stop of a dual disk check valve, comprising:

an elongate member having distal sections formed as anti-rotation features at opposite ends thereof, substantially rectangular intermediate sections coupled to the distal sections and a central portion between the intermediate sections; and bars respectively including opposite ends, the opposite ends of each of the bars being respectively coupled to respective interior portions of the intermediate sections for disposition thereof in the central portion, the bars having substantially straight and rectangular cross-sectional shapes along respective entireties of respective lengths of each of the bars and being disposed substantially in parallel with one another to define a slot in the central portion along the respective entireties of the respective lengths of each of the bars.

* * * * *